(12) United States Patent
Matsui

(10) Patent No.: US 8,189,907 B2
(45) Date of Patent: May 29, 2012

(54) INFORMATION PROCESSING METHOD, INFORMATION PROCESSING APPARATUS, AND INFORMATION PROCESSING PROGRAM

(75) Inventor: Tomohiro Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 12/104,943

(22) Filed: Apr. 17, 2008

(65) Prior Publication Data

US 2008/0267491 A1   Oct. 30, 2008

(30) Foreign Application Priority Data

Apr. 25, 2007   (JP) .................................. 2007-115791

(51) Int. Cl.
*G06K 9/00* (2006.01)
(52) U.S. Cl. .......................... 382/162; 382/165; 382/167
(58) Field of Classification Search .................. 382/165, 382/162, 167; 348/234, 277, 280, 222.1; 348/231.6; 351/243; 250/226; 375/240.19, 375/240.18
See application file for complete search history.

(56) References Cited

U.S. PATENT DOCUMENTS

| | | | | |
|---|---|---|---|---|
| 6,439,722 B1 * | 8/2002 | Seegers et al. | ................ | 351/243 |
| 6,825,876 B1 * | 11/2004 | Easwar et al. | ................ | 348/234 |
| 7,285,768 B2 * | 10/2007 | Tan et al. | ...................... | 250/226 |
| 7,369,161 B2 * | 5/2008 | Easwar et al. | ............. | 348/222.1 |
| 7,423,677 B2 * | 9/2008 | Tan et al. | ...................... | 348/277 |
| 2007/0070368 A1 | 3/2007 | Matsui et al. | .................. | 358/1.9 |

FOREIGN PATENT DOCUMENTS

| | | |
|---|---|---|
| GB | 2368436 | 5/2002 |
| JP | 2001-016379 | 1/2001 |
| JP | 2001-16449 | 1/2001 |
| JP | 2002-044478 | 2/2002 |
| JP | 2002-342048 | 11/2002 |
| WO | 2005/109324 | 11/2005 |

OTHER PUBLICATIONS

"Color Management Object Content Architecture (CMOCA) Reference", AFP Color Consortium, May 2006, First Edition.

* cited by examiner

*Primary Examiner* — Anh Hong Do
(74) *Attorney, Agent, or Firm* — Fitzpatrick, Cella, Harper & Scinto

(57) ABSTRACT

An object of the present invention is to support the user to create VDP data and use the VDP data to appropriately set a color profile to every object contained in the VDP data for printing, thereby reducing the burden of the user. The present invention an information processing method comprising a color filter setting step of setting a color filter associating a color profile and an object for variable area of variable data printing based on a filtering rule and a color profile acquisition step of obtaining the color profile associated with the color filter.

24 Claims, 15 Drawing Sheets

| No | NAME | COUNTRY | GENDER |
|---|---|---|---|
| 1 | Agnes | Greece | F |
| 2 | Tanaka | Japan | M |
| 3 | Zagallo | Brazil | M |

FIG.10

```
RULE FOR ATTACHING IMAGE IN VARIABLE AREA

RULE FOR AREA 1:
IF ATTRIBUTE "Gender" IS F,THEN Woman.tif.
ELSE,Man.jpg

RULE FOR AREA 2:
IF ATTRIBUTE "Country" IS "Japan",THEN Korea.tif.
ELSE,Kyoto.png
```

FIG.11

| PRIORITY | URI OF COLOR PROFILE | DATA ATTRIBUTE | IMAGE TYPE | IMAGE INFORMATION |
|---|---|---|---|---|
| 1 | Profile/JMPA.icc | ⟨Country⟩="Japan" | TIFF | CMYK-16bit |
| 2 | Profile/sRGB.icc | None | PNG | RGB-8bit |
| 3 | Profile/AdobeRGB.icc | None | Jpeg | None |

FIG.15

INFORMATION PROCESSING METHOD, INFORMATION PROCESSING APPARATUS, AND INFORMATION PROCESSING PROGRAM

BACKGROUND OF THE INVENTION

1. Field of the Invention

The present invention relates to an information processing method, an information processing apparatus, and an information processing program used for variable data printing (VDP).

2. Description of the Related Art

With the recent development of high-speed, high-quality electrophotographic or ink jet printing equipment, a new print-on-demand (POD) market is emerging in addition to the conventional print market. POD aims at treating a relatively small-lot print job than that for conventional printing equipment without using a large device or system in a short delivery period. Therefore, POD takes full advantage of a digital imaging device such as a digital copier and a digital multifunction device instead of a large-scale printing device and method to implement digital print using electronic data.

Such POD employs more advanced digital technology than the conventional printing technology and thus has found wide use in management and control of printing using a computer. This allows the quality of POD to be closer to that of the conventional printing technology. In such a background, the POD market provides a print for pay (PFP) service and a centralized reproduction department (CRD) service. PFP refers to a printing service provided at a copy print shop; and CRD refers to a printing service for intra-company use.

In addition, there is a method of making best use of features of the digital imaging device which is derived from POD and called variable data printing (VDP). In VDP, the content of printing can be changed based on information stored in a database each time it is printed. For example, VDP can be applied to direct mail which changes merchandise information to be provided according to customer information, detailed statement which changes numeric values according to the use state such as utility costs and the like. Therefore, VDP is quickly coming into a wide use in a market for direct mail and the like.

A piece of print data required for printing by VDP is called VDP data. An application for creating VDP data is called a VDP application. The VDP application provides a user with a user interface for page layout. For a general print layout application, the user uses the user interface to place an object such as a character and an image. For VDP, the object may change depending on the database. Accordingly, for a VDP application, the user specifies only an area, in which the object is placed, more specifically its position or its size, and the type of the object (character, image, graphics, and the like) which is placed in the area. Of the areas in which the object is placed, in particular, the area in which the object changes according to information of a record table in the database is called "variable area". On the other hand, the area in which the object does not change according to information of a record table in the database is called "fixed area".

The variable area is subject to a rule which uses the information of a record table in the database as a condition for determining the object to be placed in the variable area according to the information of a record table in the database. For example, if the value for "Age" in a record table of the database indicates "20 to 29", an image object for young person is placed in the variable area; and if the value indicates "60 or older", an image object for old person is placed in the variable area.

As described above, the VDP application creates VDP data associated with an area on a page and the database, and sends the VDP data to the digital imaging device. When the VDP data is received, the digital imaging device performs printing based on the association in the VDP data.

In order to perform the above printing, VDP needs to use a color profile to perform color conversion on an object. At present, if the color profile is not embedded in the object, VDP uses a common color profile on every object.

If VDP is not used, a color profile is applied to an object as follows. First, a keyword is extracted from intermediate print data required for printing, and a previously set score is read with reference to a predetermined association table associating a keyword with a color profile for each intermediate print data. Then, a calculation is made to obtain a product of the score and the number of extracted keywords and to select a color profile associated with a keyword having the highest product (Japanese Patent Laid-Open No. 2002-342048). Alternatively, there is another method of determining a color characteristic of an inputted document or an object and selecting an appropriate color profile based on the result (Japanese Patent Laid-Open No. 2001-16449).

As described above, a VDP application can place various objects in a variable area according to a record table of the database. In other words, a VDP application handles many objects.

In addition, the recent trend in high quality image printing requires a color conversion in which an appropriate color profile (such as an ICC profile) is selected and applied according to the object to be printed. For example, an AdobeRGB profile should be applied to an AdobeRGB image object; an sRGB profile should be applied to an sRGB image object; and a JMPA profile should be applied to a CMYK image object.

If a corresponding color profile is embedded in every object, the embedded color profile may be used. Unfortunately, this is seldom the case; thus, a color profile corresponding to the object must be set to each object.

For example, if there are three objects in a page, the user has only to specify color profiles up to three times to create print data in general. However, if there are three variable areas in a page and five different objects may be placed in each variable area, the user has to specify color profiles fifteen times (3×5=15) to create VDP data for the objects. Therefore, it is very troublesome to create VDP data and specify color profiles required for printing using the VDP data.

SUMMARY OF THE INVENTION

In view of the above problems, the present invention has been made to support the user to create VDP data and use the VDP data to appropriately set a color profile to every object contained in VDP data for printing, thereby reducing the burden of the user.

In order to solve the above problem, the information processing method in accordance with the present invention includes a color filter setting step of setting a color filter associating a color profile and an object for variable area of variable data printing based on a filtering rule; and a color profile acquisition step of obtaining the color profile associated with the color filter.

According to the present invention, an appropriate color profile can be set to every object contained in VDP data. Further, according to the present invention, the user can be relieved from the burden of setting an appropriate color profile to every object contained in VDP data.

Further features of the present invention will become apparent from the following description of exemplary embodiments (with reference to the attached drawings).

BRIEF DESCRIPTION OF THE DRAWINGS

FIG. 10 shows an example of a data structure of a record table in accordance with the present invention;

FIG. 11 shows an example of specific information in a variable area in accordance with the present invention;

FIG. 15 shows an example of a data structure of a filter database in accordance with the present invention.

DESCRIPTION OF THE EMBODIMENTS

Hereinafter, embodiments in accordance with the present invention will be described.

Figure 1:
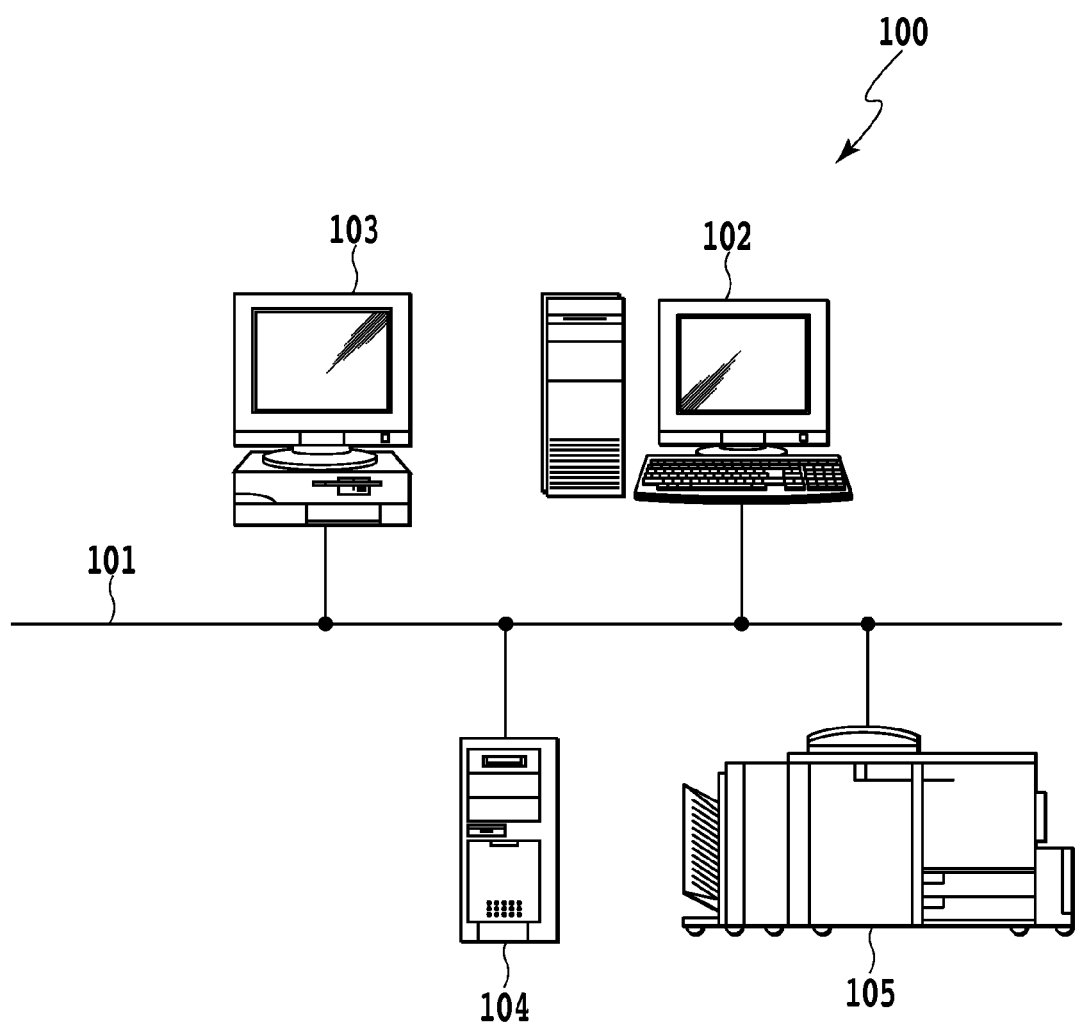
FIG. 1 shows an example of a hardware configuration in accordance with the present invention.

FIG. 1 shows an example of a hardware configuration 100 for VDP in accordance with the present invention.

As shown in FIG. 1, a network 101 connects a print server 102, a client PC 103, a database server 104, and a color or monochrome printer 105, each of which may be one or more.

The print server 102 performs a management starting with receiving VDP data from the client PC 103 and ending with outputting from the printer 105.

The client PC 103 is a computer which executes a VDP application and has a configuration to be explained with reference to FIG. 2.

The database server 104 contains a database to be referred to by the VDP data. The VDP application associates the VDP data with the database referred to by the VDP data.

Hereinafter, a workflow for the above mentioned exemplary hardware to perform VDP will be described below.

First, a VDP application running on the client PC 103 creates VDP data.

Next, the VDP application sends to the print server 102 the created VDP data and data which is required to print the VDP data and is stored in the database server 104.

The print server 102 creates a VDP job (described later) from the received VDP data and creates a print job history or cache if necessary.

Finally, the print server 102 sends the print job to the printer 105, which outputs data specified by the print job on paper.

Hereinafter, the client PC 103 will be described with reference to FIG. 2. There have been known various kinds of configurations using different connection methods, busses, and interfaces, and thus the following hardware configuration of the client PC 103 is just an example.

Figure 2:
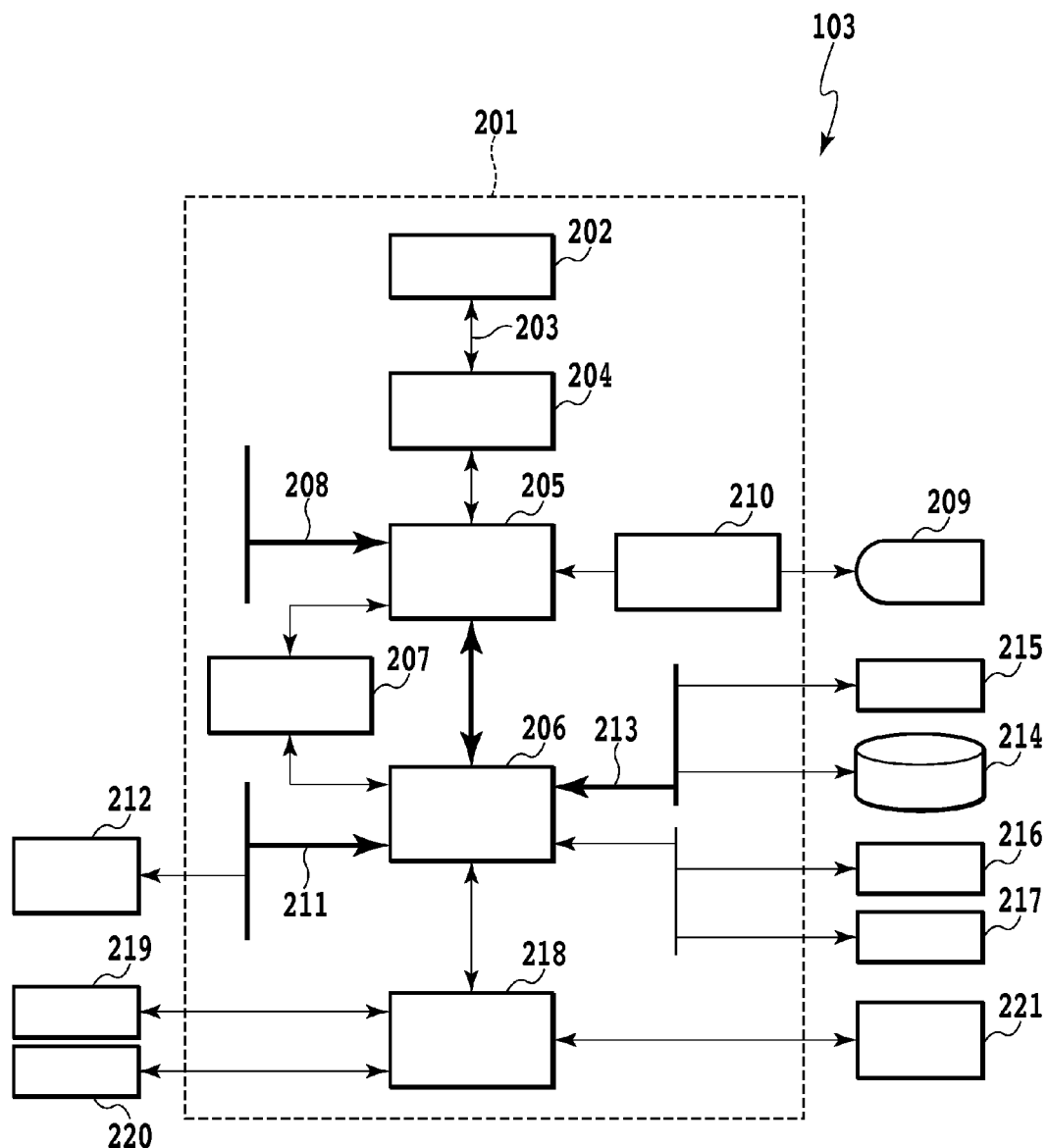
FIG. 2 shows an example of a client PC configuration in accordance with the present invention.

In FIG. 2, a mother board 201 is enclosed by dotted lines. Here, a CPU 202 is connected to a cache memory 204 via a CPU bus 203. The cache memory 204 is connected to a south bridge 206 via a north bridge 205. The CPU 202 controls the entire VDP application running on the client PC 103. Here, a memory (RAM) 207 is used to transfer data between the north bridge 205 and the south bridge 206 and to store data temporarily inside the client PC 103.

In addition, the north bridge 205 has a general purpose PCI bus 208, and can connect an external SCSI device as an option (add-on). The north bridge 205 is also connected to a graphic controller 210 for a display 209.

Further, the south bridge 206 has another general purpose PCI bus 211 which is capable of network connection via NIC 212. The south bridge 206 also has an IDE bus 213 which connects to a hard disk drive (HDD) 214, a CD-ROM (or CD-R, CD-R/W) drive 215. The hard disk drive (HDD) 214 contains control software and various kinds of data for the client PC 103. The CD-ROM (or CD-R, CD-R/W) drive 215 is used to read data when the client PC 103 is installed, or to store a large amount of data (for archive). The USB port 216 and the USB port 217 connected to the south bridge 206 can be used to access an external USB device such as a USB memory.

The I/O section 218 connected to the south bridge 206 connects to a key board 219 and a mouse 220, or a Floppy® disk (F/D) drive 221, through which data input/output can also be performed.

Hereinafter, the VDP application executed by the client PC 103 shown in FIG. 2 will be described with reference to the user interface shown in FIG. 3.

Some of the VDP application have various functions and user interfaces, and thus this embodiment is just an example.

Figure 3:
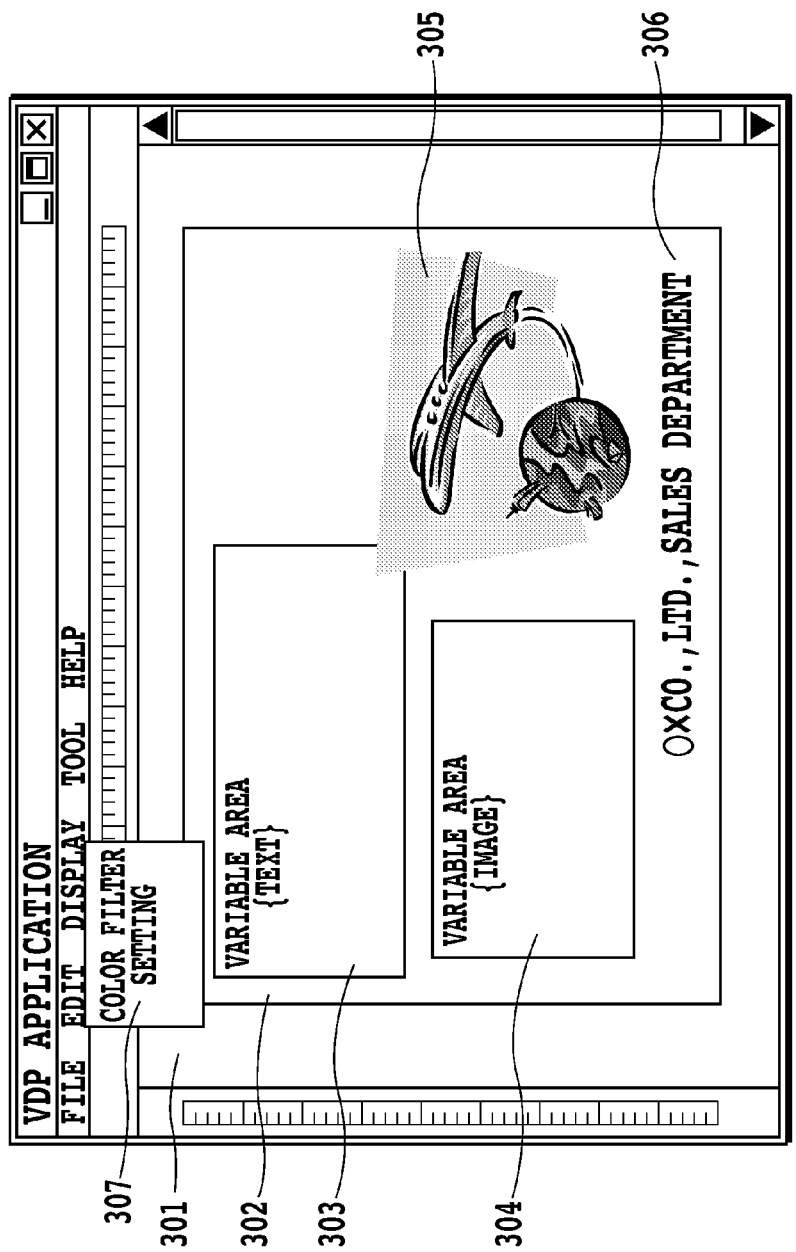
FIG. 3 shows an example of a user interface configuration in accordance with the present invention.

FIG. 3 shows an example of a user interface in which the VDP application is used to edit a piece of VDP data. This interface will be described below. The edit screen for the VDP application has an edit area 301, which contains a page area 302 showing a page boundary. The user creates VDP data by placing an object inside the page area 302.

The page area 302 shown in FIG. 3 has a total of four objects: text objects 303 and 306, and image objects 304 and 305.

Each of the text object 303 and the image object 304 is placed in a variable area, in which the text object and the image object may change according to the content of the record table. Therefore, the text object and the image object placed in the variable areas are not shown, but only their positions are shown in the edit screen.

Each of the image object 305 and the text object 306 is placed in a fixed area, in which the same text object and image object are always placed independently of the content of the record table. Therefore, the text object and the image object are actually shown in the edit screen.

Here, a significant difference from a general DTP application is that the page area 302 contains a variable area. The variable area has specific information so as to change the object placed in the variable area according to the content of the record table. The specific information consists mainly of attributes of the object (text, image, and graphics) and rules showing a correspondence to the record table.

Next, the color profile association process (hereinafter referred to as a color filter process) of the VDP application in accordance with the present embodiment will be described. The color filter process supports the user to use the VDP application to associate a desired object with a color profile to be used for printing the object. The color profile is a file used to convert an object display color into an object printing color like an ICC profile.

Figure 4:
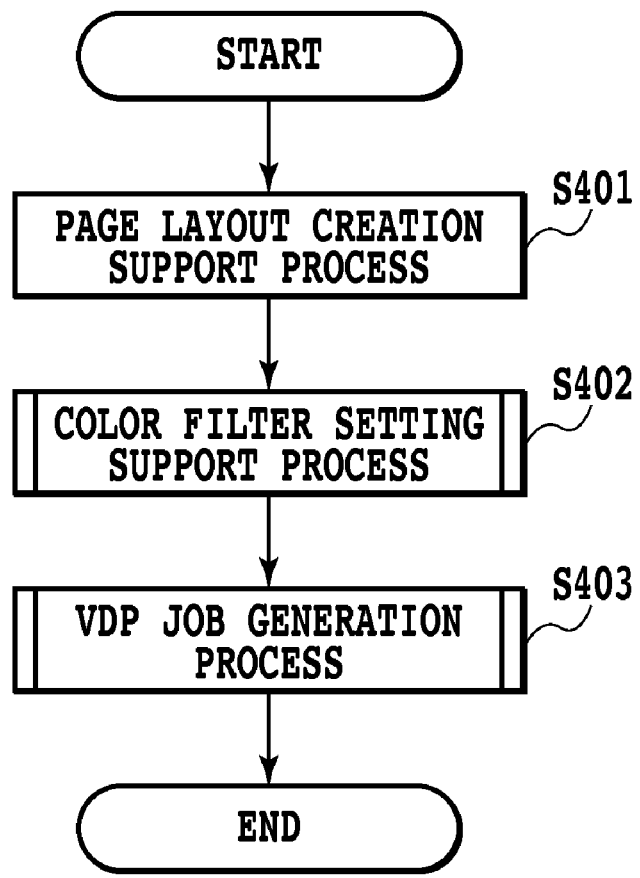
FIG. 4 is a flowchart in accordance with the present invention.

FIG. 4 is a flowchart of a color filter process in the VDP application in accordance with the present embodiment, starting with page layout creation and ending with VDP job generation. Each step and the VDP job will be described later.

According to the present embodiment, the client PC 103 executes steps 401 and 402; and the print server 102 executes step 403, but this is just an example. For example, the client PC 103 may execute all the steps 401, 402, and 403; and the VDP job (described later) may be sent from the client PC 103 directly to the print server 102.

Hereinafter, the flowchart shown in FIG. 4 will be described in detail.

First, at step 401, the VDP application operating on the client PC 103 performs a page layout creation process of supporting the user to place a fixed area and a variable area. At step 402, the VDP application also supports the user to set specific information held in the variable area. Here, as described above, the specific information indicates a correspondence between the content in the record table and the object. An example of a data structure of the record table is shown in FIG. 10; and an example of specific information is shown in FIG. 11.

The specific information can be used to specify key information (hereinafter referred to as an image object key) indicating one-to-one correspondence to the image object. For example, "Woman.tif", "Man.jpg", "Korea.tif", and "Kyoto.png" shown in FIG. 11 are the file names of corresponding image objects, each of which is an image object key. The image object key is obtained when the image object is stored in a content database described later. The present embodiment assumes that the image object to be used has already been stored in the content database. In addition, the content database is provided in the database server 104 shown in FIG. 1.

Next, at step 402, the VDP application supports setting a filter (hereinafter referred to as a color filter) for associating the color profile to the variable area in which the object is placed at step 401.

AT step 402, the VDP application running on the client PC 103 finally generates VDP data required for VDP printing as well.

Next, the VDP application transfers the VDP data generated at step 401 and the color filter set at step 402 to the print server 102.

The VDP application running on the print server 102 generates a VDP job from the VDP data and the color filter transferred by the client PC 103 (step S403).

The VDP job associates the object placed in the fixed area and the object obtained from the specific information set in the variable area, each of which is placed at step 401, with the color profile.

The difference between a piece of VDP data and a VDP job will be described below. The VDP data associates a color profile and an object with reference to the specific information of the variable area and the content of the record table; VDP job directly associates every object to a corresponding color profile without reference to the specific information of the variable area and the content of the record table. Accordingly, the VDP job has a simpler data structure than the VDP data.

At step 403, the VDP application generates the VDP job by directly associating the VDP data with the object placed in the variable area. The process is performed as follow. First, the VDP application uses the color filter set at step 402 to associate the object (such as an image object) associated with the VDP data at the previous process, with the color profile.

Figure 12:
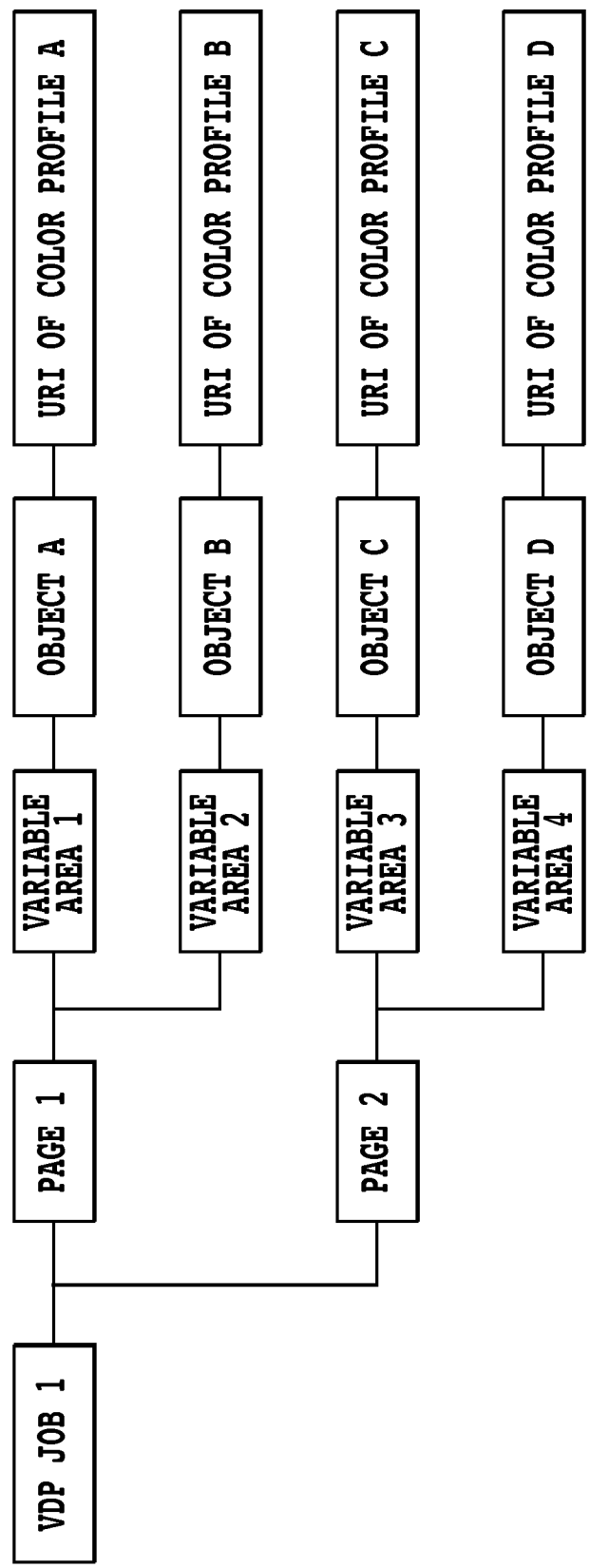
FIG. 12 shows an example of a data structure of a VDP job in accordance with the present invention.

Finally at step 403, the VDP application generates the VDP job having a data structure shown in FIG. 12. The VDP job 1 shown in FIG. 12 has a page 1 and a page 2. The page 1 has a variable area 1 and a variable area 2. The variable area 1 contains an object A, to which a URI (identifier) of the color profile A is allocated. Likewise, the variable area 2 contains an object B, to which a URI (identifier) of the color profile B is allocated. The page 2 has a variable area 3 and a variable area 4. The variable area 3 contains an object C, to which a URI (identifier) of the color profile C is allocated. Likewise, the variable area 4 contains an object D, to which a URI (identifier) of the color profile D is allocated.

Figure 9:
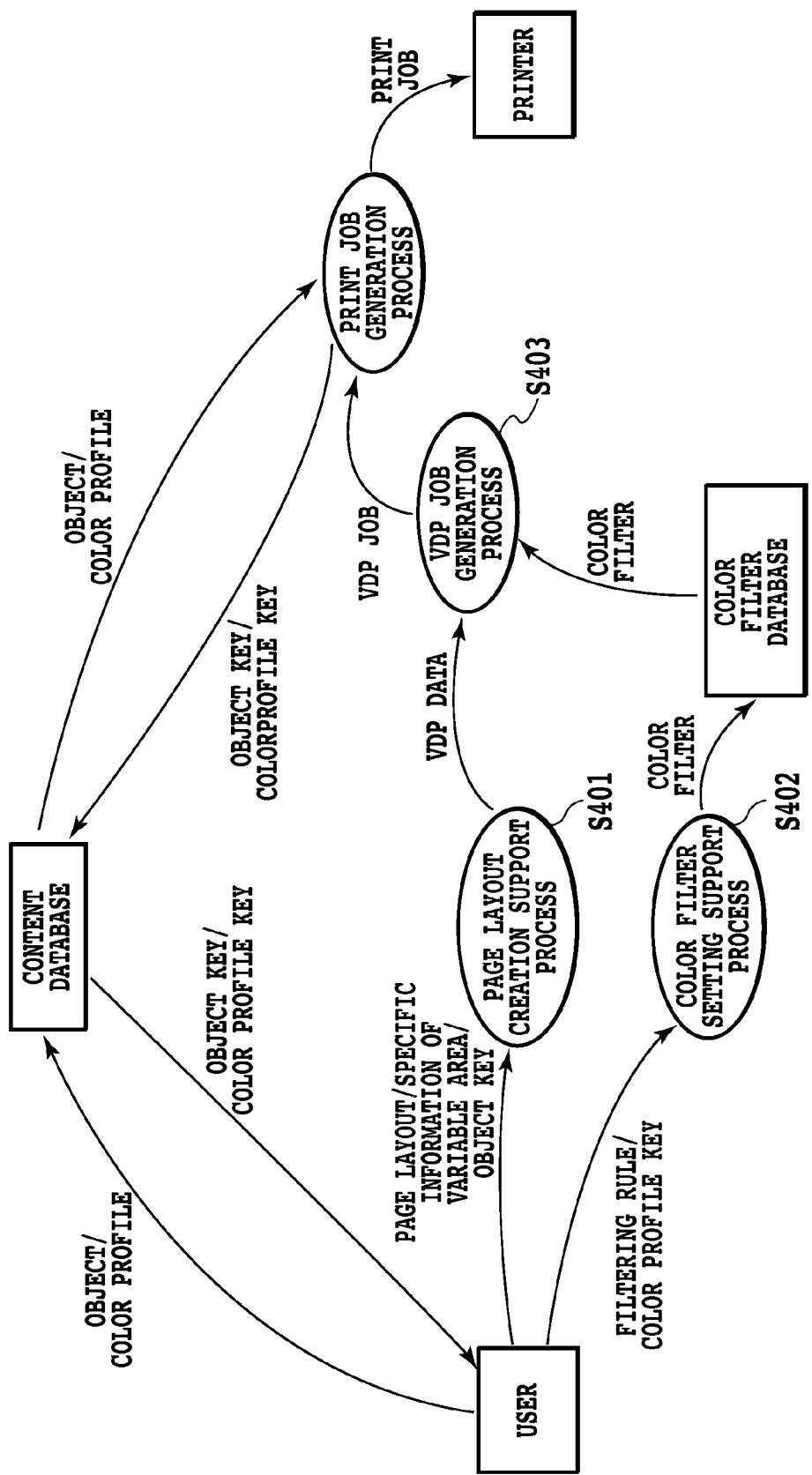
FIG. 9 shows a data flow in accordance with the present invention.

FIG. 9 shows a data flow in accordance with the present embodiment showing the correspondence between VDP data, specific information, VDP job, and steps 401 to 403 shown in FIG. 4.

Figure 5:
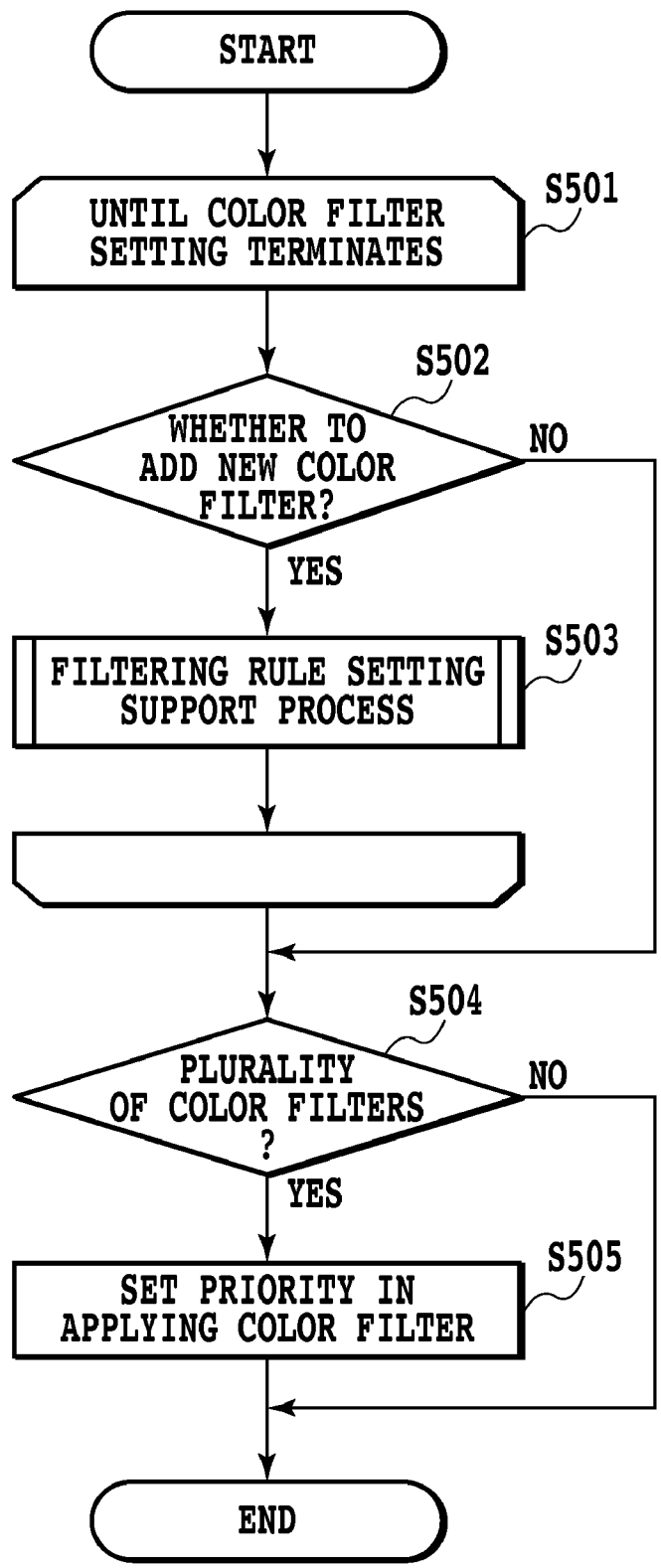
FIG. 5 is a detailed flowchart of a color filter setting support process shown in FIG. 4.
Figure 13:
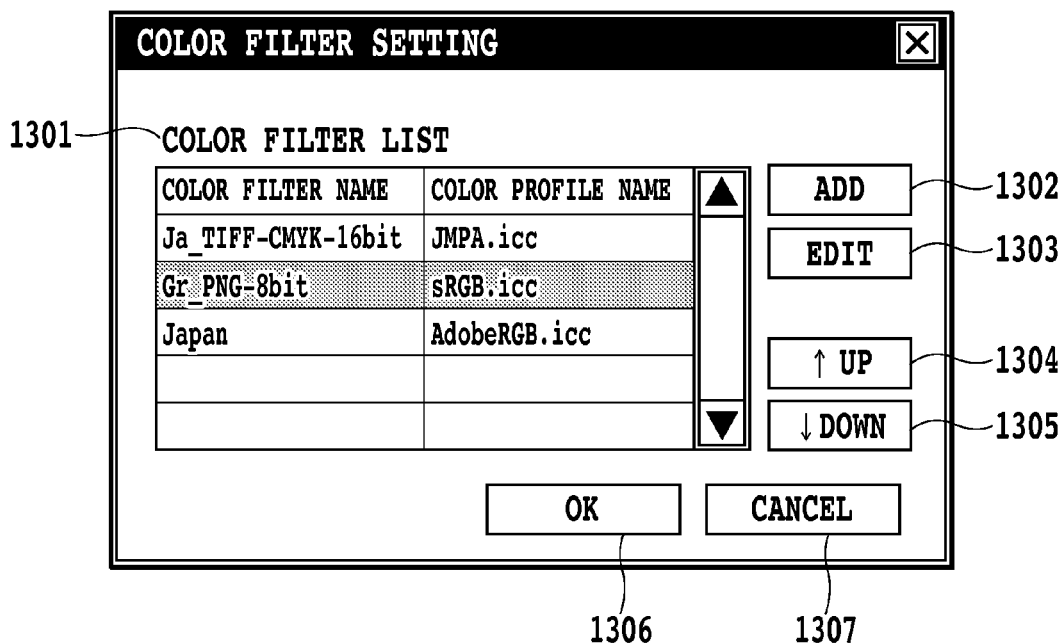
FIG. 13 shows an example of a user interface configuration in accordance with the present invention.
Figure 14:
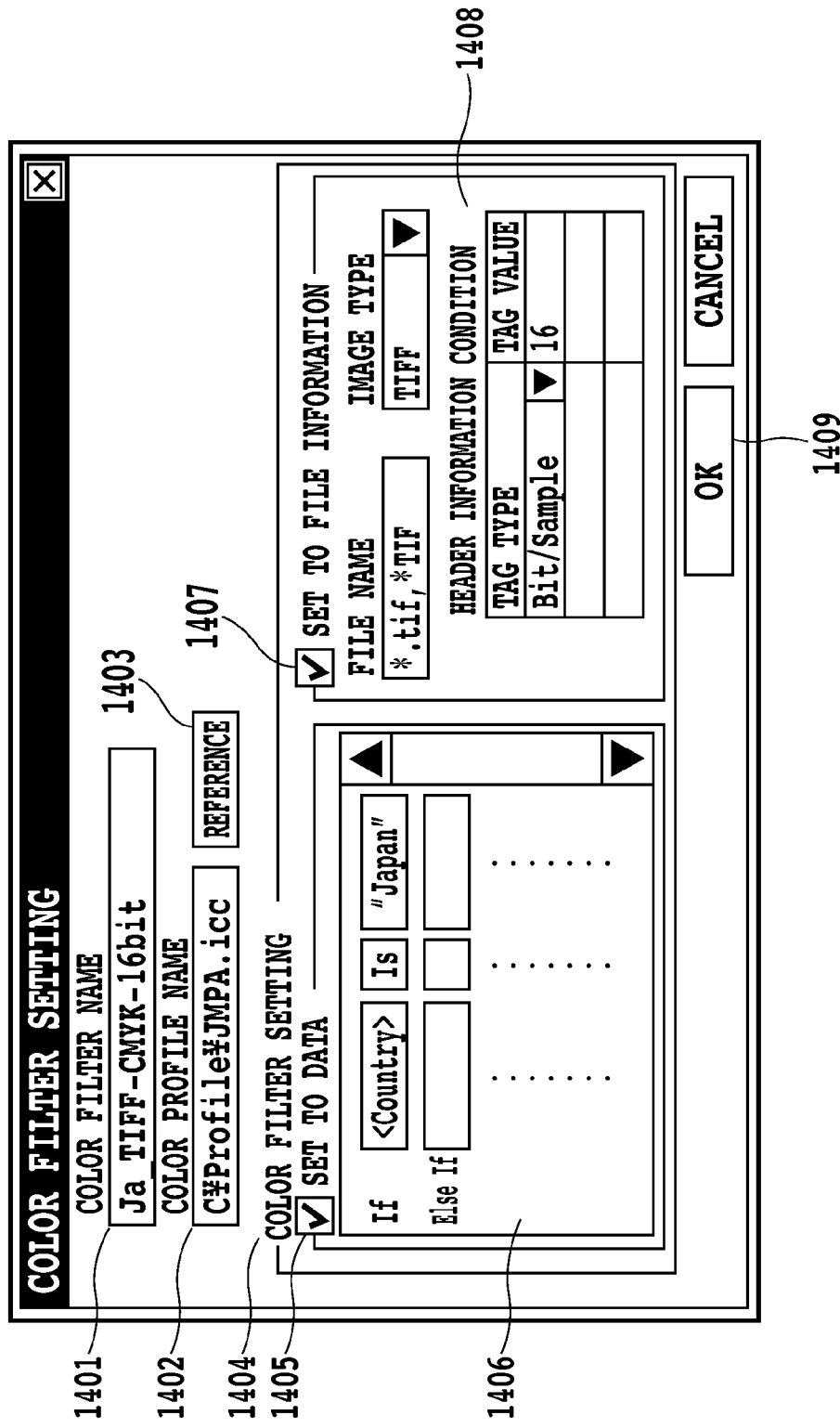
FIG. 14 shows an example of a user interface configuration in accordance with the present invention.

FIG. 5 is a detailed flowchart of the step 402. FIGS. 13 and 14 show user interfaces related to the flowchart shown in FIG. 5. The flowchart shown in FIG. 5 will be described later with reference to FIGS. 12 and 13.

The following description will focus on how the VDP application supports setting a color filter. First, when the user selects the item 307 "color filter setting" in the user interface shown in FIG. 3, the VDP application executes the step 402. According to the present embodiment, one color filter may be set to all variable areas, or a color filter may be set for each variable area in which the object is placed.

When the user selects the item 307 "color filter setting", the VDP application displays the user interface shown in FIG. 13.

The VDP application displays "color filter list" 1301 shown in FIG. 13, which indicates previously stored color filter names and their associated color profile names. When the user wants to newly add a color filter (step S502), the user presses a button "Add" 1302 corresponding to the color filter. Then, the VDP application executes a filtering rule setting support process (step S503) described later. Alternatively, when the user wants to edit an already set color filter, the user selects the desired color filter from "color filter list" 1301, and presses a button "Edit" 1303. Then, the VDP application executes a filtering rule setting support process (step S503).

When the user presses the button "Add" 1302 or the button "Edit" 1303, the VDP application starts setting the color filter. The VDP application repeats setting the color filter any number of times until the user presses a button "OK" 1306 or a button "cancel" 1307 (step S501). It should be noted that if there is no color filter name in "color filter list" 1301, and even if the user presses the button "Edit" 1303, the VDP application cannot start setting the color filter.

If there are a plurality of color filters (step S504), the VDP application allows the user to select a color filter from "color filter list" 1301. The VDP application uses priority setting support means to support the user to set or change the priority in applying the color filter. More specifically, when the user presses a button "up" 1304 or a button "down" 1305, the VDP application sets or changes the priority (order of priority) in applying the color filter (step S505). Each time the user presses the button "up" 1304, the VDP application increases the priority (order of priority) in applying the color filter selected by the user. On the other hand, each time the user presses the button "down" 1305, the VDP application decreases the priority (order of priority) in applying the color filter selected by the user.

Figure 6:
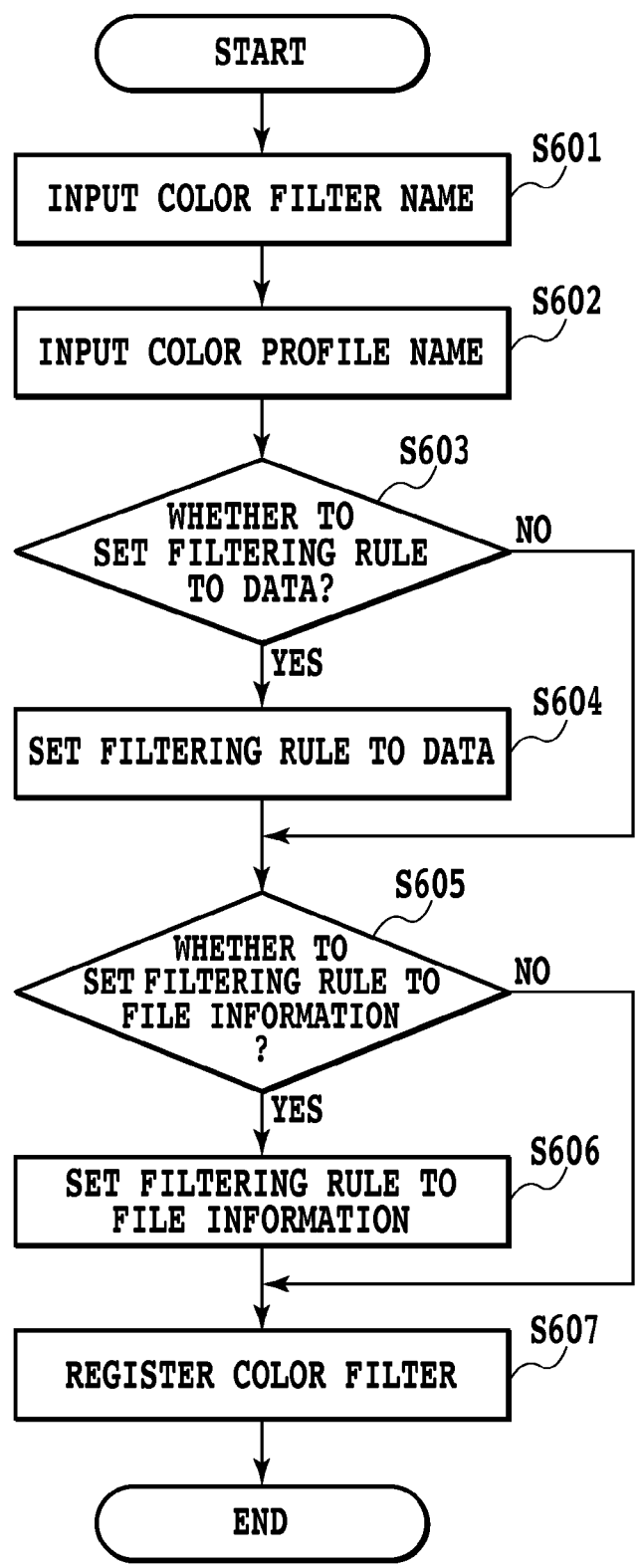
FIG. 6 is a detailed flowchart of a filtering rule setting support process shown in FIG. 5.

FIG. 6 is a detailed flowchart of a filtering rule setting support process shown at step 503. FIG. 14 shows a user interface related to the flowchart shown in FIG. 6. FIG. 15 shows a data structure of a filter database. The flowchart shown in FIG. 6 will be described with reference to FIGS. 14 and 15.

When the user presses the button "Add" 1302 or the button "Edit" 1303 in the interface displayed by the VDP application shown in FIG. 13, the VDP application executes the step 503.

When the user presses the button "Add" 1302 or the button "Edit" 1303, the VDP application displays the interface shown in FIG. 14.

Here, when the user presses the button "Add" 1302, previously stored data about a color filter is not displayed in the user interface. On the other hand, when the user presses the button "Edit" 1303, previously stored data about the color filter is displayed in the user interface. Hereinafter, the process to be performed by the VDP application when the user presses the button "Add" 1302 will be described.

First, the user uses the VDP application to set the name of a color filter to be newly added, to a text box "color filter name" 1401 (step S601). Here, the user can input any character.

Next, the user uses the VDP application to input a color profile key of the color profile to a text box "color profile name" 1402 (step S602). If the currently set filtering rule is satisfied, the color profile specified by the color profile key is applied to the image object.

The color profile key is key information having a one-to-one correspondence to a file of the color profile in the content database, and is obtained when the color profile is stored in the content database. According to the VDP application in accordance with the present embodiment, a path of the color profile (place in which the color profile is stored) may be used as the color profile key, but is not limited to this. Alternatively, for example, the color profile to be used may be stored in the content database. Yet alternatively, the user may press a button "Reference" 1403 using the VDP application to display a file dialog and select the color profile key to be used.

The VDP application supports the user to set the filtering rule for the color filter, the name of which is defined in the text box "color filter name" 1401, to the filed "color filter setting" 1404. When the user uses the VDP application to set the filtering rule for the variable area of the VDP data (step S601), first, the user checks a check box "set to data" 1405. Then, the user can set the filtering rule to a field "set to data" 1406 using the information in the record table as the condition, in the same manner as when the user sets the specific information of the variable area of the VDP data (step S603).

The field "set to data" 1406 shown FIG. 14 shows an example indicating that if "Japan" is defined in a column "<Country>" of the record table, then this filtering rule is applied. The VDP application allows the user to define a plurality of filtering rules as shown above.

When the user sets a filtering rule to the file information, the user checks a check box "set to file information" 1407 (step S605). Then, the user can set the filtering rule to the file information in a field "set to file information" 1408 (step S606). The file information indicates an indicator such as a file name of the object, a file format, and header information of TIFF.

In the field "set to file information" 1408 shown in FIG. 14, the following settings are performed. More specifically, if there is an object in which the file name is "*.tif" or "*.TIFF", and the file format is "TIFF" file, and "Bit/Sample" of the header information is "16", then the filtering rule is applied to the object. Here, the filtering rule is set in the field 1406.

When the user presses the button "OK" 1409, the VDP application terminates the color filter setting support process.

When the color filter setting process terminates, the VDP application stores the color filter in the filter database having a data structure shown in FIG. 15 (step S607). For example, the filter database is installed in the database server 104.

Figure 7:
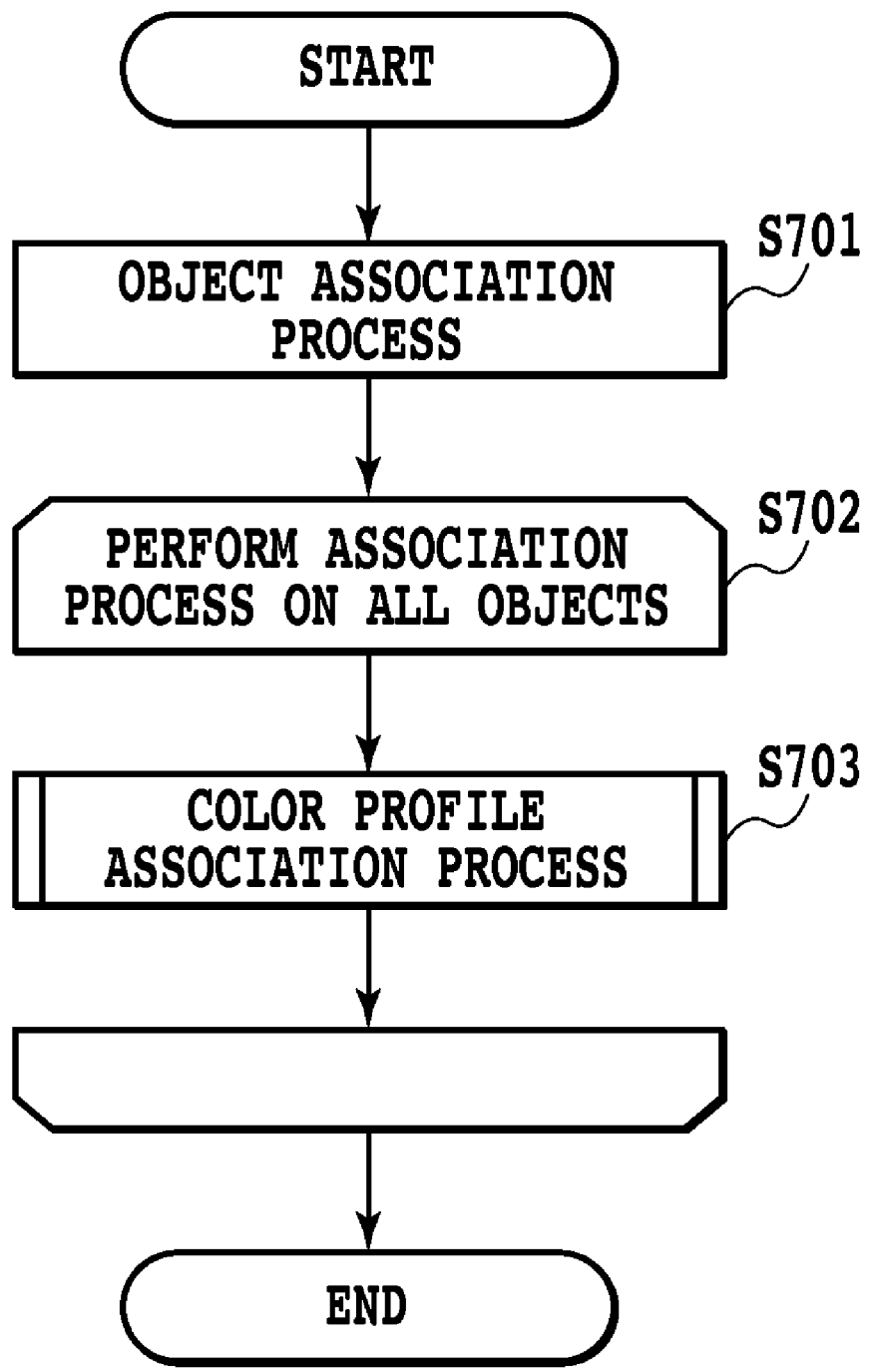
FIG. 7 is a detailed flowchart of a VDP job creation process shown in FIG. 4.

FIG. 7 is a detailed flowchart of the step 403. All VDP applications execute steps 701 to 703 shown in FIG. 7. The flowchart shown in FIG. 7 will be described below.

When the VDP data and the color filter are transferred from the client PC 103 to the print server 102, the step 403 starts. When the step 403 starts, the print server 102 performs an association process between the object and the color profile using specific information in the variable area of the VDP data (step S701).

If a plurality of objects are placed in the variable area (step S702), the color profile association process is performed, a color profile is allocated to every object (step S703) and a VDP job is generated.

Figure 8:
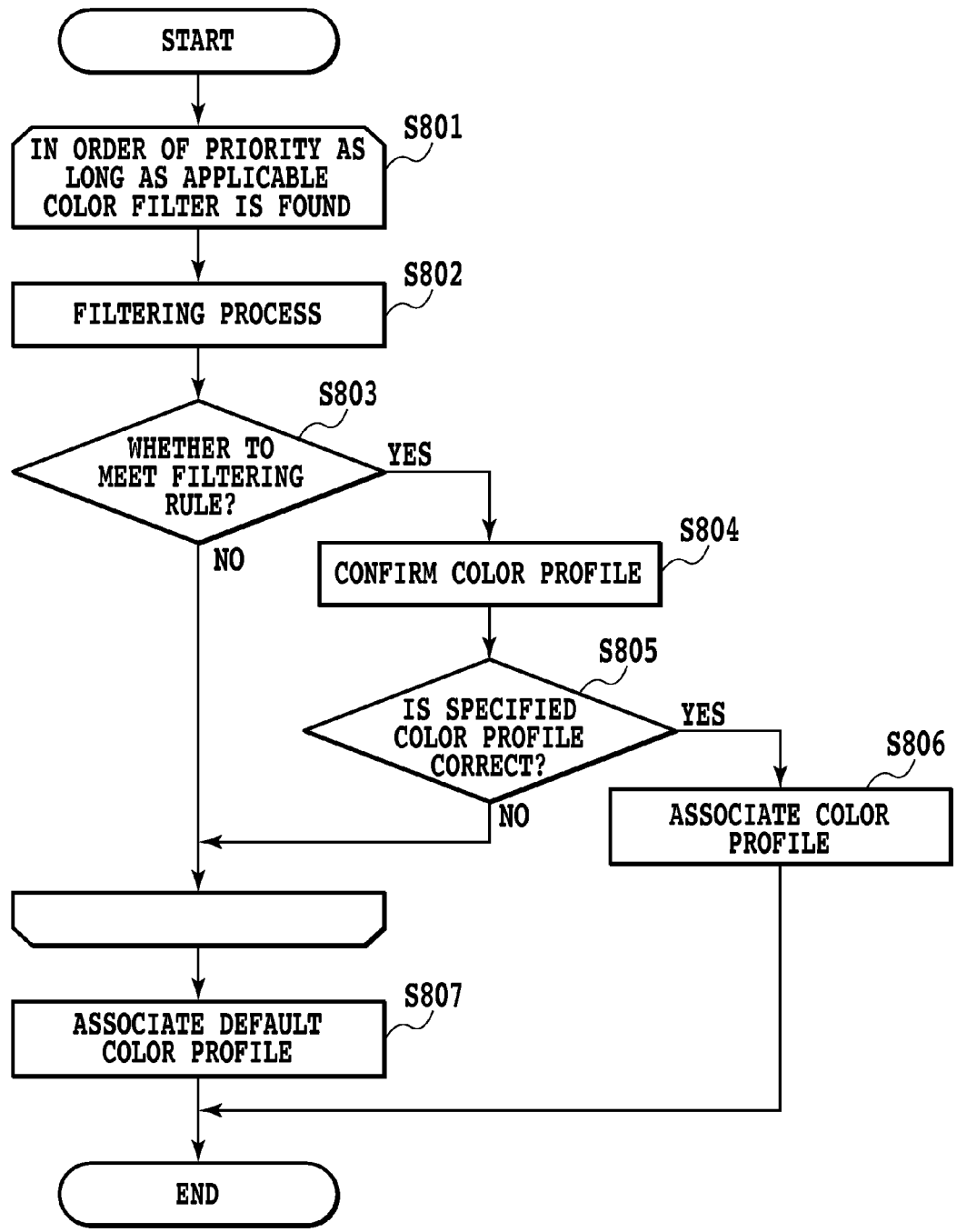
FIG. 8 is a detailed flowchart of a color profile association process shown in FIG. 7.

FIG. 8 is a detailed flowchart of the step S703. The VDP application executes all the steps S801 to S807 shown in FIG. 8. The flowchart shown in FIG. 8 will be described below.

For the VDP data having a variable area in which the object is placed and the object is subject to the color profile association process, filtering is performed on the color filter set at step 402 in order of priority starting with the higher priority as long as an applicable color filter is found (step S801). The filtering is to check whether the record table and the header information of the object associated at the 701 process match the filtering rule set to the filter (step S802).

A logical operation is performed using a condition contained in the filtering rule until a color profile key meeting the condition is found (step S803). Here, the logical operation may be performed using one or more filtering rules. Then, the color profile is obtained from the content database by the color profile acquisition means and the color profile key is used to determine whether the color profile allocated by the color filter is correct or not (steps S804 and 805). If the color profile is correct (step 805), the color profile specified by the color filter is associated (step 806). A correct color profile indicates that for example, the image object and the color profile have the same number of channels or the color profile has a correct format (step 805). For example, if the color profile is RGB profile for 3 channel RGB image object and the image object is CMYK image object, the color profile is incorrect since the number of channels of the image object is different from that of the color profile.

If there is no color filter meeting the filtering rule (step S803), filtering is repeated as long as an applicable color filter is found.

Even if the color filter meets the filtering rule (step S803), but if the color profile specified by the color filter is not correct (step S805), filtering is also repeated as long as an applicable color filter is found.

When there is no color filter to be applied to filtering, a default color profile is associated with the object (step S807). The default color profile is provided for each color space and contains "sRGB.icc" for an RGB image, "JMPA.icc" for a CMYK image, or the like. If there is no color filter to be applied to filtering and no default color profile is defined, the VDP application issues an alarm indicating that color conversion cannot be performed on the object.

For example, if the filter database has a data structure shown in FIG. 15, the filtering rule is applied as follows. First, if the column <Country> is "Japan", the image object is a CMYK image, the number of bits is 16 bits, and the file format is TIFF, then the color profile "JMPA.icc" is applied to the object.

For example, if the image object associated with an arbitrary record table is an RGB image, and the file format is TIFF, then no color profile shown in FIG. 15 is applied to the object. In this case, the VDP application applies a predetermined default color profile to the object (step S807).

As described above, according to the present embodiment, the VDP application generates the VDP job which allows the user-desired color profiles to be collectively applied to every object contained in every page based on the filtering rule.

The above is a description of the color filter process performed by the VDP application in accordance with the present embodiment. The above description focuses on an example of the color filter process to be mainly applied to an image object, but the same process can be applied to not only the image object, but also a text object, a graphics object and the like.

Hereinafter, the process of printing a VDP job generated as shown in the flowchart of FIG. 4 will be briefly described.

The VDP job generated at step 403 is transferred to the print server 102 where the VDP application performs a color conversion process using a color profile and a conversion into a print job which can be interpreted by the printer. The print job is transferred to the printer. The printer 105 outputs data specified by the received print job.

As described above, according to the present embodiment, the VDP application supports the user to place an object and set a filtering rule. The VDP application generates the VDP job which allows the user-desired color profiles to be collectively applied to every object contained in every page based on the filtering rule. The VDP job has a simple data structure which directly associates every object to a corresponding color profile without reference to the specific information of the variable area and the content of the record table. Conventionally, the application of a color profile to an object using VDP is very complicated, but the VDP application can perform this process based on a simple data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115791, filed Apr. 25, 2007, which is hereby incorporated by reference herein in its entirety.

What is claimed is:

1. An information processing method comprising:
a color filter setting step of setting, using one or more processors, a color filter associating a color profile and an object for variable area of variable data printing based on a filtering rule; and
a color profile acquisition step of obtaining the color profile associated with said color filter.

2. The information processing method according to claim 1, further comprising a filtering rule setting step of specifying one or more pieces of information in a record table as a condition of the said filtering rule.

3. The information processing method according to claim 2, wherein said filtering rule setting step specifies one or more indicators contained in file information as the filtering rule.

4. The information processing method according to claim 2, wherein said filtering rule setting step specifies one or more object file names as the filtering rule.

5. The information processing method according to claim 2, wherein said filtering rule setting step specifies one or more file formats contained in file information as the filtering rule.

6. The information processing method according to claim 1, further comprising a filtering step of filtering said object by said color filter, wherein said filtering step performs a logical operation using the one or more filtering rules.

7. The information processing method according to claim 6, wherein said filtering step uses the one or more filtering rules set at said color filter setting step and continues filtering for the information in the record table or the file information about the object until the condition is met.

8. The information processing method according to claim 6, wherein said filtering step specifies a predetermined default color profile to an object which fails to meet the condition although all filtering rules set at said color filter setting step are used for filtering.

9. An information processing apparatus comprising:
color filter setting means of setting a color filter associating a color profile and an object for variable area of variable data printing based on a filtering rule; and
color profile acquisition means of obtaining the color profile associated with said color filter.

10. The information processing apparatus according to claim 9, further comprising filtering rule setting means of specifying one or more pieces of information in a record table as a condition of the said filtering rule.

11. The information processing apparatus according to claim 10, wherein said filtering rule setting means specifies one or more indicators contained in file information as the filtering rule.

12. The information processing apparatus according to claim 10, wherein said filtering rule setting means specifies one or more object file names as the filtering rule.

13. The information processing apparatus according to claim 10, wherein said filtering rule setting means specifies one or more file formats contained in file information as the filtering rule.

14. The information processing apparatus according to claim 9, further comprising filtering means of filtering said object by said color filter, wherein said filtering means performs a logical operation using the one or more filtering rules.

15. The information processing apparatus according to claim 14, wherein said filtering means uses the one or more filtering rules set by said color filter setting means continues filtering for the information in the record table or the file information about the object until the condition is met.

16. The information processing apparatus according to claim 14, wherein said filtering means specifies a predetermined default color profile to an object which fails to meet the condition although all filtering rules set by said color filter setting means are used for filtering.

17. A computer-readable storage medium storing an information processing program, the information processing program comprising:
color filter setting means of setting a color filter associating a color profile and an object for variable area of variable data printing based on a filtering rule; and
color profile acquisition means of obtaining the color profile associated with said color filter.

18. The computer-readable storage medium according to claim 17, wherein the information processing program further comprises filtering rule setting means of specifying one or more pieces of information in a record table as a condition of the said filtering rule.

19. The computer-readable storage medium according to claim 18, wherein said filtering rule setting means specifies one or more indicators contained in file information as the filtering rule.

20. The computer-readable storage medium according to claim 18, wherein said filtering rule setting means specifies one or more object file names as the filtering rule.

21. The computer-readable storage medium according to claim 18, wherein said filtering rule setting means specifies one or more file formats contained in file information as the filtering rule.

22. The computer-readable storage medium according to claim 17, wherein the information processing program further comprises filtering means for filtering said object by said color filter, wherein said filtering means performs a logical operation using the one or more filtering rules.

23. The computer-readable storage medium according to claim 22, wherein said filtering means uses the one or more filtering rules set by said color filter setting means and continues filtering for the information in the record table or the file information about the object until the condition is met.

24. The computer-readable storage medium according to claim 22, wherein said filtering means specifies a predetermined default color profile to an object which fails to meet the condition although all filtering rules set by said color filter setting means are used for filtering.

* * * * *